United States Patent
Shi

(10) Patent No.: US 6,495,794 B2
(45) Date of Patent: Dec. 17, 2002

(54) RAPID PROTOTYPING METHOD USING 3-D LASER INNER CUTTING

(76) Inventor: Hanmin Shi, East-one block 67-202, Huazhong University of Science & Technology, Wuhan, Hubei Province, 430074 (CN)

( * ) Notice: Subject to any disclaimer, the term of this patent is extended or adjusted under 35 U.S.C. 154(b) by 0 days.

(21) Appl. No.: 09/774,049

(22) Filed: Jan. 31, 2001

(65) Prior Publication Data

US 2002/0100750 A1 Aug. 1, 2002

(51) Int. Cl.⁷ .......................... B23K 26/38; B23K 26/40
(52) U.S. Cl. ........................ 219/121.72; 219/121.67; 219/121.68; 219/121.69
(58) Field of Search ................. 219/121.67, 121.68, 219/121.69, 121.72; 264/400

(56) References Cited

U.S. PATENT DOCUMENTS

| | | | |
|---|---|---|---|
| 3,715,734 A | | 2/1973 | Fajans |
| 4,041,476 A | * | 8/1977 | Swainson |
| 4,092,518 A | | 5/1978 | Merard |
| 4,469,930 A | * | 9/1984 | Takahashi |
| 4,546,231 A | | 10/1985 | Gresser et al. |
| 4,698,480 A | * | 10/1987 | Klingel |
| 4,914,270 A | * | 4/1990 | Copley et al. ......... 219/121.68 |
| 4,915,757 A | * | 4/1990 | Rando |
| 5,247,923 A | | 9/1993 | Lebourg |
| 5,575,936 A | | 11/1996 | Goldfarb |
| 5,637,244 A | | 6/1997 | Erokhin |
| 5,786,560 A | | 7/1998 | Tatah et al. |
| 5,886,328 A | | 3/1999 | Vasiliev et al. |
| 6,163,010 A | * | 12/2000 | Kobsa ................... 219/121.67 |
| 6,214,276 B1 | * | 4/2001 | Gelbart |

* cited by examiner

Primary Examiner—Geoffrey S. Evans
(74) Attorney, Agent, or Firm—Siemens Patent Services, LC

(57) ABSTRACT

An apparatus and method for forming a three-dimensional object within a block of transparent material by using a laser beam. This is useful in the field of rapid prototype manufacturing (RPM) in which a computer-generated CAD file defining an object may be converted directly to the described object. A CAD surface model is sliced and the data from the sliced model used as input to a numerically controlled machine. Because only the surface of the volume being cut from the solid block must be scanned by the laser beam, this process is much faster than other RPM manufacturing techniques where a laser beam must scan every point inside the shape being formed. Objects having complex geometries and/or hollow interiors may readily be formed using the disclosed apparatus and method.

21 Claims, 6 Drawing Sheets

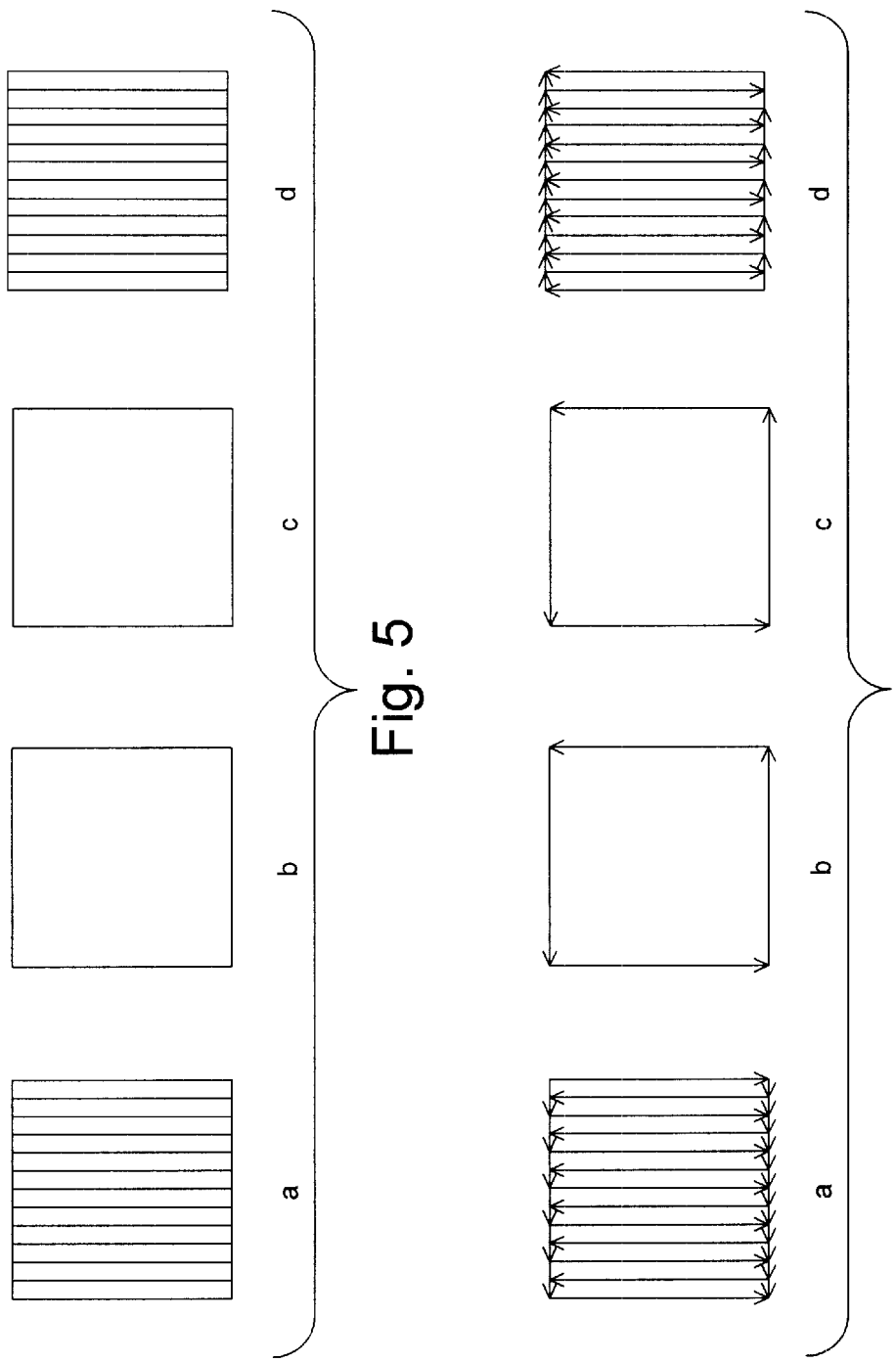

RAPID PROTOTYPING METHOD USING 3-D LASER INNER CUTTING

BACKGROUND OF THE INVENTION

1. Field of the Invention

The present invention relates to a method for laser cutting. More particularly, the invention comprises a novel method for cutting three-dimensional (3-D) objects from solid blocks by inner cutting. The method is particularly useful for rapidly producing prototypes of solid or hollow shell objects.

Globalization and requirements for customization have brought intensive competition to into the manufacturing field. The requirements for upgrades to existing products as well as the rapid introduction of new products in a competitive market has placed great stress on product developers. To maintain their competitive edge, manufacturers have been forced to seek better ways to create evaluation prototypes of proposed design changes to exiting products as well as totally new products. In recent years, design efforts have been focused on the use of Computer Aided Design (CAD) systems. Methods for directly converting CAD output files into prototypes are very desirable and have been eagerly sought. Starting in the late 1980s, a new field of endeavor, Rapid Prototyping Manufacturing (RPM) first appeared in the United States. The essence of RPM methods is to allow direct conversion of CAD system outputs directly into solid prototypes. One method for accomplishing this process is to "grow" the prototype thereby eliminating the need for molds, fixtures, jigs, fixtures, or other specialized machining equipment. The solid models resulting from this process may then be observed, evaluated, and/or tested. In addition, the solid prototypes may be turned into "hard" (e.g., metal) parts by precision casting or other similar processes.

There are many different prototyping methods currently available for use. These may be divided into two broad categories. The first involves growing a solid shape by adding material, bit-by-bit in a controlled manner. Examples of this class of method included stereo lithography using a Stereo Lithographic Apparatus (SLA), Selective Laser Sintering (SLS) and Fused-Deposition Modeling (FDM). The second category involves adding materials in thin layers to form the desired shape. These methods are best represented by the Laminated Object Manufacturing (LOM) technique.

In stereo lithography, a CAD 3-D model is first sliced into thin layers using software well known to those skilled in the 3-D modeling arts. A laser beam at an appropriate wavelength is controlled to selectively scan the surface of a pool of photosensitive resin. The result is that the laser beam cures and solidifies the surface layer of the resin on a platform in accordance with the shape of the defined slice of the model currently being processed. The process starts with the bottom layer and, after a layer is defined and cured, the platform is incrementally lowered, the platform travel being defined by the thickness of the computer-generated layers. This allows the liquid resin in the pool to cover the solidifying layer. These process steps are repeated until the desired three-dimensional object is complete.

This process differs from the inventive prototyping process in that while the laser beam scans only the surface of the material being formed into an object, in effect, every point within the volume of the solid being produced must ultimately be scanned. This requires a relatively long time to accomplish and uses large amounts of electrical energy. The inventive process, on the other hand, must only trace the contour of the required solid within a solid volume from which the prototype object is being formed. This requires significantly less time and uses much less energy. RPM is currently a vigorously researched field because it still promises shorting development cycles.

Currently used rapid prototyping technologies have the following limitations: First, process times are deemed excessively long. To make a relatively large part with complex geometry can take a few days to a whole week. The reason for this low productivity lies in the volume scan characteristic of methods of the prior art which require the laser beams to scan every point inside the shape being formed. Typically, the focal point of a laser beam is around 0.1 mm or less. Consequently, the total scanning path will be very long contributing to the long processing time and high-energy consumption.

Second, prototype part precision is usually compromised. Cured layers are prone to warp, especially when in large parts. Also, the contraction of resin during laser curing process in the SLA method as well as possible paper distortion after absorbing moisture in the LOM method may seriously affect the precision of the finished parts.

Third, the necessary equipment required to practice the methods of the prior art are is usually quite complex. All of the rapid prototyping methods described hereinabove invariably require a moving platform which must be specially designed, thus adding to the investment in equipment.

Forth, the complexity of the shapes which may be created using prior art methods is limited. The inner-cutting method of the present invention can, however, follow very intricate geometries in a single surface scan, and is even able to cut out an enclosed shell inside another enclosed shell.

2. Discussion of the Related Art

U.S. Pat. No. 3,715,734 for MEMORY STORAGE DEVICE AND METHOD OF MAKING SAME, issued Feb. 6, 1973 to Jack Fajans, teaches a method whereby a laser may selectively carbonize spots within a block of polymethylmethacrylate. The carbonized spots so formed may later be "read" as binary data. FAJANS teaches no method for cleaving a three-dimensional object from within a block of suitable material by means of a dilated, suitably focused laser beam.

Several United States patents have been issued which address the use of a laser to physically change an interior point within a solid which is transparent to the wavelength of the laser. For example, U.S. Pat. No. 4,092,518 for METHOD OF DECORATING A TRANSPARENT PLASTIC MATERIAL ARTICLE BY MEANS OF A LASER BEAM, issued May 30, 1978 to Rene' Remy Merard; U.S. Pat. No. 5,575,936 for PROCESS AND APPARATUS FOR ETCHING AN IMAGE WITHIN A SOLID ARTICLE, issued Nov. 19, 1996 to Boris Goldfarb; U.S. Pat. No. 5,637,244 for METHOD AND APPARATUS FOR CREATING AN IMAGE BY A PULSED LASER BEAM INSIDE A TRANSPARENT MATERIAL, issued Jun. 10, 1997 to Alexander I. Erokhin; U.S. Pat. No. 5,786,560 for 3-DIMENSIONAL MICROMACHINING WITH FEMTO-SECOND LASER PULSES, issued Jul. 28, 1998 to Abdelkrim Tatah, et al.; and U.S. Pat. No. 5,886,318 for METHOD FOR LASER-ASSISTED IMAGE FORMATION IN TRANSPARENT OBJECTS, issued Mar. 23, 1999 to Anatoly Valentinovich Vasiliev, all teach methods for forming a viewable image inside a solid piece of a transparent material. However, none of these patents teaches or suggests a method for forming a three-dimensional, solid or hollow shell shape within a block of transparent material.

The instant invention, on the other hand, teaches an apparatus and method whereby a solid object may be completely formed inside a block of a suitable transparent material.

U.S. Pat. No. 4,546,231 for CREATION OF A PARTING ZONE IN A CRYSTAL STRUCTURE, issued Oct. 8, 1985 to Herbert D. Gresser, et al. teaches the use of a laser beam to create a parting zone in a crystalline material such as diamond. An energy-transmissive window is first prepared on the outside of the crystal. This window transmits the energy of a laser beam to successive damage zones, typically adjacent one another whereby the crystal structure is destroyed. The crystal may then easily be fractured along the parting zone created by the successive damage zones. In contradistinction, the instant invention provides for the formation of a solid, three-dimensional object totally within a block of transparent material. There is no reliance on the material being crystalline. The inventive formation process relies upon carbonization of a series of sites within the transparent material which define the surface of the desired three-dimensional object being formed.

U.S. Pat. No. 5,247,923 for METHOD OF FORMING A DIAMOND DRILL BIT ELEMENT USING LASER TRIMMING, issued Sep. 28, 1993 to Maurice P. Lebourg, teaches a method similar to that of GRESSER, et al. described hereinabove. Desired cut lines within a diamond crystal are identified and selectively removed leaving a series of truncated conical structures, eventually, after successive cuts, resulting in a drill bit having a predetermined shape. Unlike the apparatus and method of the present invention, no internal, three-dimensional shape is formed in a solid block of non-crystalline material.

None of the above inventions and patents, taken either singly or in combination, is, however, seen to anticipate or suggest the instant invention as claimed.

SUMMARY OF THE INVENTION

The present invention relates to an apparatus and method for forming a solid, three-dimensional object within a block of transparent material by means of a laser beam. This invention is particularly useful in the field of rapid prototype manufacturing (RPM) wherein a computer-generated CAD file defining an object may be converted directly to the described object using the inventive method. Because only the surface of the volume being cut from the solid block must be scanned by the laser beam, the inventive process is much faster than other RPM manufacturing techniques, such as SLA or SLS, wherein a laser beam is required to scan every point inside the shape being formed. This saves large amounts of time and electrical energy over methods of the prior art. In addition, parts having complex geometries and/or part having hollow shells may readily be formed.

Accordingly, it is a principal object of the invention to provide a rapid prototyping method for forming a three-dimensional object within a block of transparent material using a laser beam.

It is another object of the invention to provide a rapid prototyping method using a laser beam wherein all cutting is accomplished in a single scan of the surface of the object being formed.

It is a further object of the invention to provide a rapid prototyping method using a laser beam which can quickly form the desired part using minimum energy.

Still another object of the invention is to provide a rapid prototyping method using a laser beam which requires a relatively small capital investment.

An additional object of the invention is to provide a rapid prototyping method using a laser beam which can produce objects having complex geometries.

It is again an object of the invention to provide a rapid prototyping method using a laser beam which can produce hollow objects.

It is a still further object of the invention to provide a rapid prototyping method using a laser beam which avoids forming the desired object from individual layers of material such as the LOM method, or by accumulating material bit-by-bit, such as the SLA or SLS methods of rapid prototyping.

It is yet another object of the invention to provide a rapid prototyping method using a laser beam which forms object having high strength and good mechanical stability.

It is an additional object of the invention to provide a rapid prototyping method using a laser beam which may be practiced in conjunction with standard numerically-controlled machine tools, such as milling machines and lathes with added laser beam generators and optical systems.

It is another object of the invention to provide a rapid prototyping method using a laser beam wherein the desired part is formed directly from a computer-aided design (CAD) file.

It is an additional object of the invention to provide a rapid prototyping method which can simultaneously forms both positive and negative prototype molds during a single scan.

It is yet another object of the invention to provide a rapid prototyping method which provides an easy correction of focal point location differences caused by the refractive index of the bulk material being machined.

It is a still further object of the invention to provide a rapid prototyping method using a laser beam which is inexpensive to implement and operate and which may be easily used.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIGS. 5a–5d show the slicing of a solid model perpendicular to the vertical direction;

FIGS. 6a–6d show examples of typical focal point scan paths corresponding to the slices of FIGS. 5a–5d, respectively;

DETAILED DESCRIPTION OF THE PREFERRED EMBODIMENTS

The present invention relates to an apparatus and method for forming a solid, three-dimensional object within a block of transparent material by means of a laser beam. This invention is particularly useful in the field of rapid prototype manufacturing (RPM) wherein a computer-generated CAD file defining an object may be converted directly to the described object using the inventive method.

Figure 1:
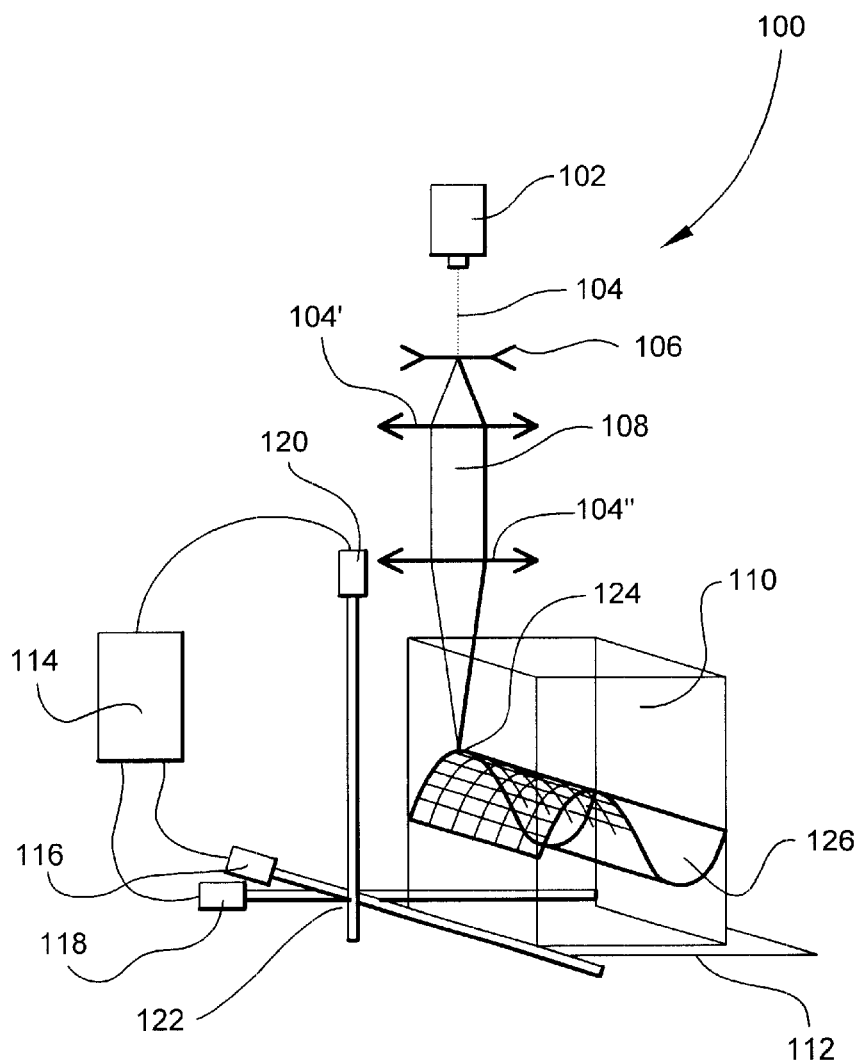
FIG. 1 is a schematic, perspective view of an apparatus for forming solid, three-dimensional shapes in accordance with the present invention.

Referring first to FIG. 1, there is shown a schematic, perspective view of a first embodiment of an apparatus for forming a solid, three-dimensional shape in a block of material, generally at reference number 100. A ND-YAG pulse laser 102 generates a laser beam typically having a wavelength of approximately 1.06 nM at an output power rating of typically in the range of between approximately 5 and 50 Watts. The required laser power requirement is, of course, dependant upon material characteristics and the feed rate. It will be obvious to those skilled in the arts that other choices of laser type and power could be made to suit a particular operating environment or requirement. A concave lens 106 is placed in the path of beam 104 from laser 102. Lens 106 dilates (expands) beam 104. Dilated beam 104' is then directed through a focusing system 108. Laser focusing systems are well known to those skilled in the art and any suitable system known to those so skilled may be utilized to perform its intended function. The focused beam 104" is introduced into a block of transparent material 110 situated on the table 112 of a numerically controlled (NC) machining system (i.e., machine tool), shown schematically at reference number 114. Transparent material 110 must be transparent to electromagnetic energy at the particular operating wavelength of the laser chosen for cutting. As dilated, focused laser beam 104" passes through transparent material 110, the low energy density of laser beam 104" will result in low energy absorption by material 110. Consequently, the dilated laser beam 104" will pass through material 110 without changing the material properties and laser beam 104" will experience relatively low loss of energy (i.e., decline in intensity). However, because of the high energy density at the focal point 124 of laser beam 104", material 110 is heated at the focal point of laser beam 104". This causes local, substantial changes in properties in material 110 at that point 124. Material properties such as transparency change. As material 110 becomes less transparent at that focal point 124 of laser beam 104", the energy absorption rate increases causing even more rapid heating of material 110 to occur. By selecting the laser power and pulsing characteristics, material 110 may be locally heated until it reaches its melting point. In an ideal match between the laser 102 and material 110, energy absorption should be high enough so that carbonization and vaporization quickly occur. The carbonization and vaporization lowers the material strength at the point 124 and generally causes the formation of tiny cracks (not shown) at that point. This process resembles a positive feedback loop in the control theory, and the whole melting process at each point takes only a fraction of a second.

The selection of material 110 is important. On one hand, materials that have very good transparency characteristics at the operating wavelength of the particular laser chosen may be penetrated deeply.

However, the low absorption rate does not allow the rapid property changes necessary to provide efficient cutting (i.e., carbonization, vaporization and fracturing). On the other hand, materials with absorption rates that are too high for the particular laser type applied will cause significant energy decline of the laser beam 104" before reaching a practical cutting depth inside material 110.

Typically, macromolecule organic materials such as polystyrene, polycarbonate, or acrylonitrile-styrene have produced good cutting results. It will be obvious to those skilled in the material sciences that many other material and laser wavelength combinations could be chosen to utilize the method of the present invention, the critical criteria being that carbonization and vaporization quickly occur after melting at a desired operating depth within the bulk material.

Numerical control (NC) system 114 is provided with driving mechanisms 116, 118, 120 which create movement along three possible axes: X, Y, and Z, respectively, upon command from numeric control system 114. Numeric control system 114 may be adjusted so that the focused beam 104 " enters material 110 such that the focal point of beam 104" coincides with a point 124 on the surface of the object 126 being formed within material 110.

Numeric control unit 114 typically comprises a personal computer (not shown) or other similar controller (not shown). Generally, this computer or controller is adapted to receive numeric control instructions (not shown) generated by a CAD/CAM or similar computer application program (not shown) operated external to the computer or controller. It will be obvious that various methods for generating numerical control instructions, either manual or automatic, may be used to provide control data to numeric control unit 114. These methods form no part of the present invention.

In the embodiment shown in FIG. 1, typically laser 102 and its attendant lens 106 and focusing system 108 are disposed in a fixed position relative to platform 112. In this embodiment, only platform 112 is moved along the X, Y and Z-axes to define shape 126 within material 110. It will be obvious that in alternate embodiments, laser 102 could be moved relative to material 110 which could be held stationery to accomplish the same purpose. It yet other embodiments, both laser 102 and material 110 could be moved relative to one another.

Figure 2:
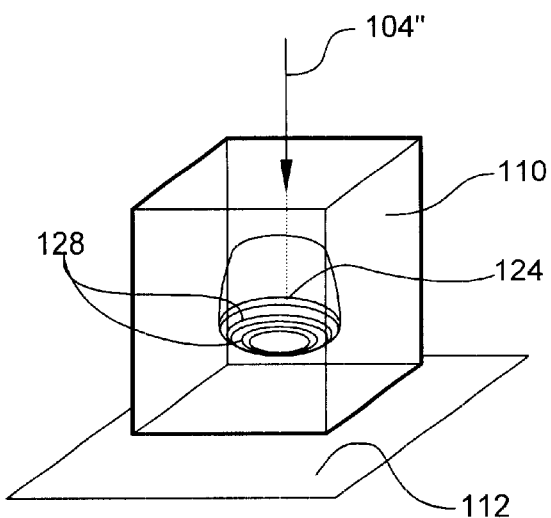
FIG. 2 is a perspective view showing a complex, three-dimensional shape formed within a block of material.

Referring now to FIG. 2, there is shown a perspective view showing a closed shape being cut within a block of material 110. Three-dimensional CAD/CAM modeling software (not shown) is used to first generate a three-dimensional solid model (not shown) of the desired part and then to convert the solid model into a surface model. The CAD software is then used to slice the surface model into cross sections 128. The focal point of laser beam 104" is shown directed to an interior region of material 110 to a point on the perimeter of cross-section 128 closest to platform 112, that is, the point furthest from laser 102 (FIG. 1).

In operation, the machining program (not shown) defining the desired part is started. The program is adapted to scan along the perimeter of each cross-section 128 layer-by-layer until the entire part is separated from the rest of the material 110 blank. The result is a closed, shaped three-dimensional work piece.

Figure 3:
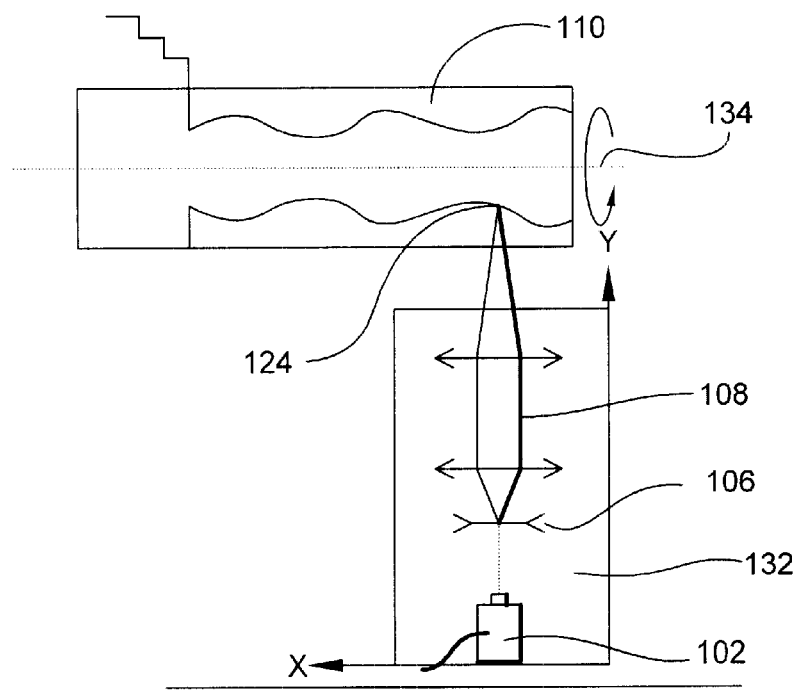
FIG. 3 is a cross-sectional, diagrammatic view of a complex shape being formed in a solid block of material.

Referring now to FIG. 3, there is shown a method for "turning" a revolving part. Laser 102 is shown with concave lens 106 and focusing system 108 disposed on the tool mounting bracket 132 of a numerically controlled lathe (not shown in its entirety). Cutting tool bracket 132 may move in the X and Y planes as required to achieve the desired shape. Material 110 is secured in the chuck (not shown) of the NC lathe so that it is rotated about the axis of rotation 134 of the lathe chuck. As material 110 is rotated about axis 134, laser 102 with its attendant concave lens 106 and focusing system 108 is moved as required to "turn" the desired shape inside the block of transparent material 110.

A typical application of the inventive method may be seen in the following example. The example is chosen for purposes of disclosure and the invention is not considered limited to the example. The desired three-dimensional shape is a 20 mm×20 mm×20 mm cube. An AutoCAD® Version 12 program was first used to design the 20 mm×20 mm×20 mm three-dimensional cubic model and then to produce a surface model from the solid model. The surface model was then sliced into 200 slices in a vertical direction, each slice having a 0.1 mm thickness. Referring now to FIGS. 5a–5d, there are shown views of four slices representative of the 200 slices. FIG. 5a is the bottom slice, FIG. 5b is the second slice, FIG. 5c is 199th slice and FIG. 5d is the top slice. Referring now also to FIGS. 6a–6d, there are shown laser trace paths associated, respectively with the four typical slices of FIGS. 5a–5d.

Figure 4:
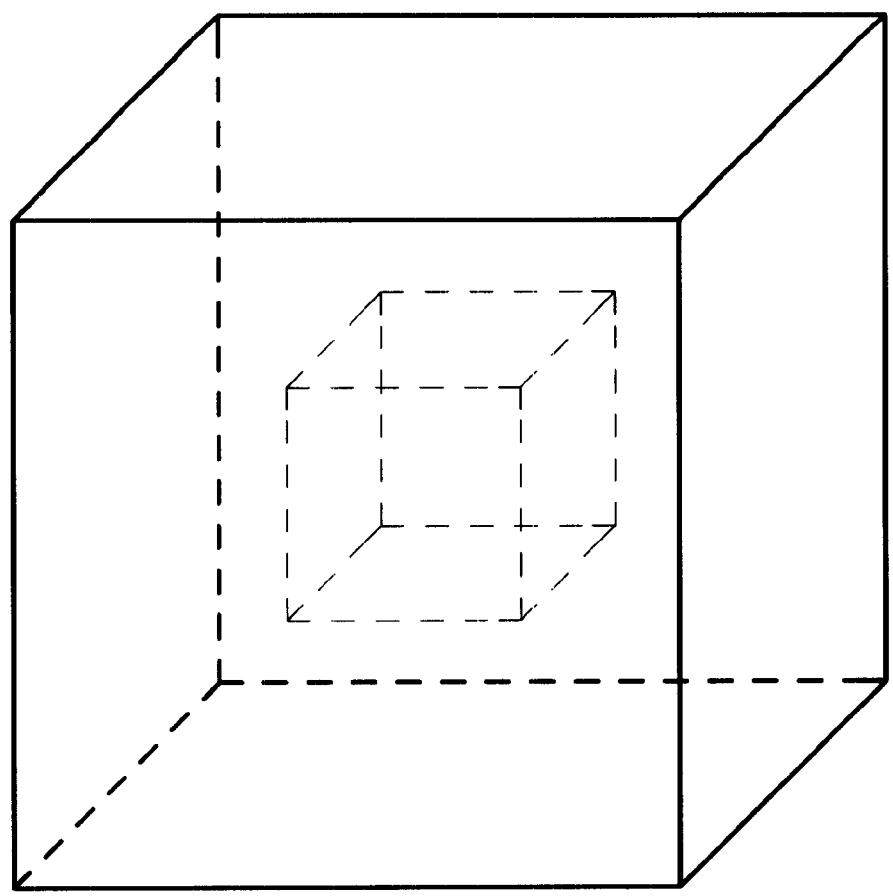
FIG. 4 is a perspective view of a cutting result still encased in the original material block.

A G-code program having relative coordinates as is well known to those skilled in the CAD/CAM arts was next produced. A block of polystyrene having the dimensions 60 mm×60 mm×40 mm was chosen for the example. A ND-YAG and a typical three-axis numerically-controlled milling machine were chosen and the stock material was fixed to the table of the milling The laser was operated at an output power of approximately 5 watts and a pulse frequency of approximately 3000 Hz. The laser beam was focused at a point defining the upper right corner of the bottom layer. The numerically controlled milling machine was adjusted to a feed rate of approximately 200 mm/minute. This relatively low feed rate was necessitated by the capability of the milling machine utilized for the experiments and does not represent any inherent feed rate limitation of the inventive process. The numeric control program for executing the G-code was started and the cutting operation begun. The resultant cube is shown in FIG. 4.

It will be obvious that at the end of the cutting operation that a three-dimensional part is trapped inside the outer shell of the bulk material. A suitable cutting operation must be used to free the desired article. In addition, if the three-dimensional article produced is hollow, stock material still trapped inside the shell must also be suitable cut apart and removed. These cutting operations may be performed as a final part of the forming operation using the same laser system or, alternatively, may be performed as a post-processing operation using conventional cutting tools.

Figure 7:
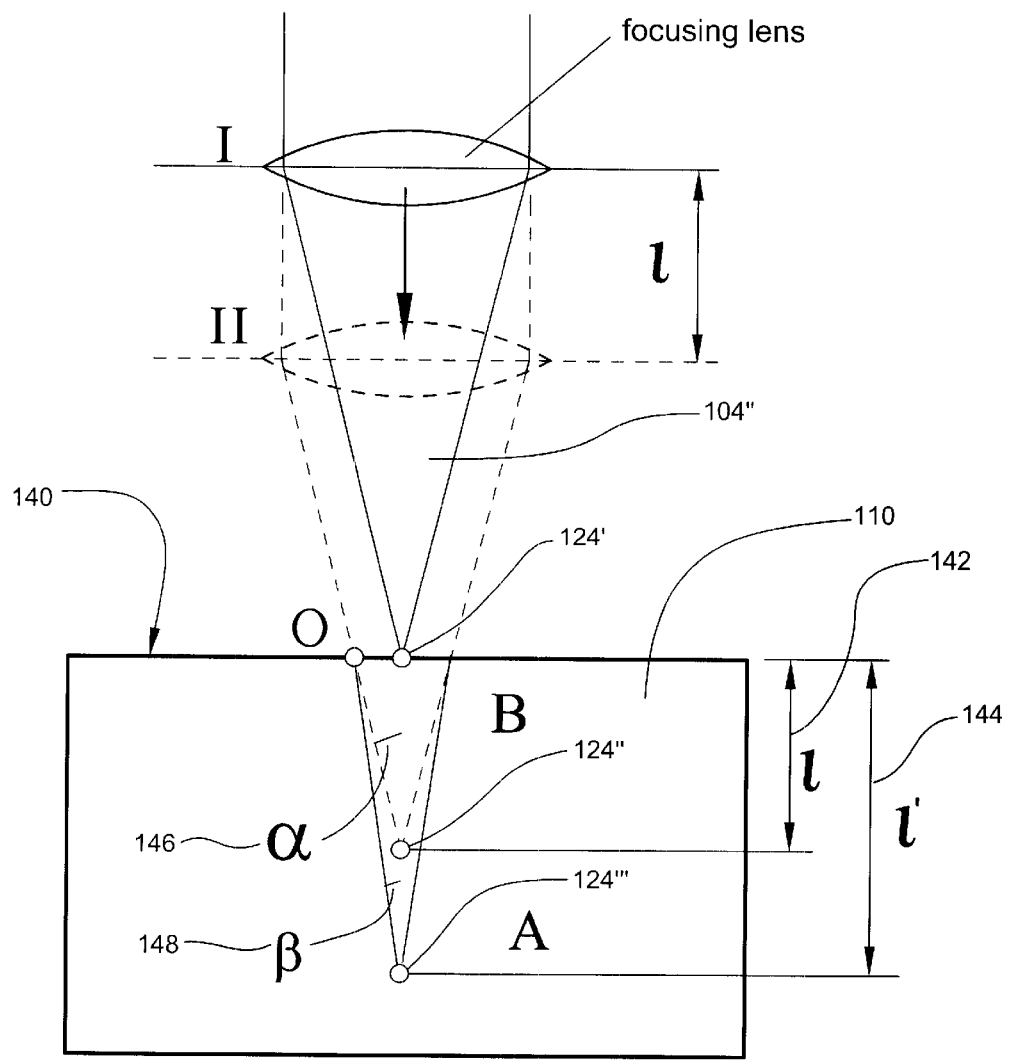
FIG. 7 is a schematic view of a portion of the inventive system shown compensation for the refractive index of the material base on the depth of cut.

Referring now to FIG. 7, there is shown a schematic diagram of a portion of the system for practicing the inventive method. In performing the inventive method, a compensation must be made in the focusing of the laser beam dependant upon the depth within the material. This is because the material being machined has a refractive index greater than unity (1).

When focusing lens 108' is in a first position I relative to the surface 140 of material block 110, the focal point 124' of the laser beam 104" is on surface 140. If focusing lens 108' is moved a distance l closer to material block 110, it would be anticipated that the focal point of the laser beam 104" would move a corresponding distance 1 into material black 110 to produce a focal point 124". Instead, because of the index of refraction of the material block 110 being >1, a focal point 124"at a distance l' into material When angles α and β are small, tan α≈sin α and:

tan β≈sin β Consequently:

tan α/tan β=l'/l≈sin α/sin β=n

Manipulating these equations yields the relationship:

$$l'=nl$$

This approximation provides a simple method for adjusting the information provided to the numerically controlled machine so that the prototype part is correctly formed in the material block.

Figure 8:
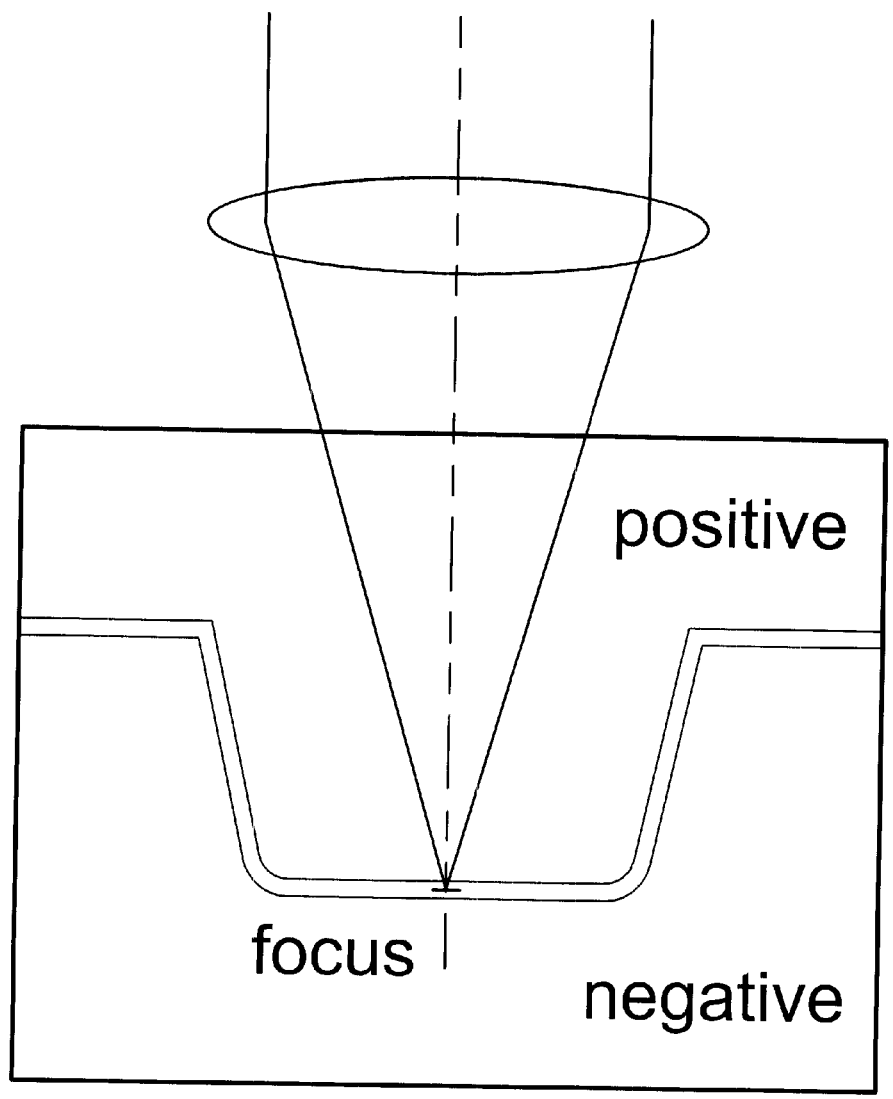
FIG. 8 is a cross-sectional, schematic view showing the formation of both positive and negative prototype molds.

The inventive rapid prototyping method has yet another advantage over other methods of the prior art. Because the cut line formed by the laser beam in the solid material block is extremely thin, both a positive and a negative image of the desired shape and size may be formed simultaneously. This is particularly useful when the prototype is to be used as a mold and both a negative and positive shape may be useful. This is shown in FIG. 8. block 110 results. Two angular relationships α 146 and β 148 are shown on FIG. 7. It may be shown that the relationship between the intended movement l and the actual resulting movement l' of focal point within the material follows an approximate relationship of:

$$l'=nl$$

where: n is $\sin(\alpha)/\sin(\beta)$;

l is the distance the focus has been moved;

and l' is the actual distance the focal point moves in the material block.

This relationship is true for $\beta \leq 20°$.

This approximation may be developed by noting that:

$$\overline{OA}=\overline{AB} \tan \alpha = \overline{AC} \tan \beta \text{ so that:}$$

$$\tan \alpha / \tan \beta = \overline{AC}/\overline{AB}=l'/l$$

It is to be understood that the present invention is not limited to the embodiments described above, but encompasses any and all embodiments within the scope of the following claims.

What is claimed is:

1. A method for producing a three-dimensional article, the steps comprising:

a) providing a laser system having a predetermined operating wavelength, a predetermined pulse repetition rate, and a predetermined power output and comprising an expanding, focusing subsystem for providing a dilated, focused laser beam at said predetermined operating wavelength;

b) providing a piece of transparent material having a width, a height and a length, said material being substantially transmissive to electromagnetic energy at said predetermined operating wavelength;

c) providing manipulation means releasably coupled to said piece of transparent material to move said transparent material in a direction corresponding to at least one of the group: X-axis, Y-axis and Z-axis, said movement being responsive to a control signal adapted to place at least one interior point within said transparent material at a focal point of said dilated, focused laser beam;

d) providing a control signal representative of a predetermined three-dimensional shape;

e) selectively operating said laser to trace only the surface outline of said predetermined, three-dimensional shape at an interior region of said transparent material as said transparent material is moved in response to said control signal, and wherein said laser beam has a first expanded section with a first beam intensity with a low absorption rate which is transparent to the material, for permeating the material without causing physical changes, and said laser beam subsequently tapering into a focused spot having a second beam intensity with a high absorption rate sufficient enough to cause physical changes, such as cutting;

whereby as said transparent material is moved past the focal point of said laser beam, said predetermined, three-dimensional shape is defined within an interior region thereof and substantially totally separated therefrom.

2. The method for producing a three-dimensional article as recited in claim 1, wherein said manipulation means comprises a numerically-controlled machine.

3. The method for producing a three-dimensional article as recited in claim 2, wherein said numerically controlled machine comprises at least one from the group: numerically controlled lathe, numerically controlled milling machine and other specialized numerically controlled machine.

4. The method for producing a three-dimensional article as recited in claim 1, wherein said laser system comprises a pulsed laser system.

5. The method for producing a three-dimensional article as recited in claim 4, wherein said laser system comprises a ND-YAG laser.

6. The method for producing a three-dimensional article as recited in claim 1, wherein said predetermined power is in the range of approximately 5–50 watts.

7. The method for producing a three-dimensional article as recited in claim 1, wherein said predetermined three-dimensional shape comprises a hollow shell.

8. The method for producing a three-dimensional article as recited in claim 1, wherein said providing a control signal step (d) comprises using an electronic controller operatively connected to said manipulation means.

9. The method for producing a three-dimensional article as recited in claim 8, wherein said electronic controller comprises a personal computer.

10. The method for producing a three-dimensional article as recited in claim 8, wherein said predetermined, three-dimensional shape is represented by data comprising a surface model thereof.

11. The method for producing a three-dimensional article as recited in claim 10, wherein said surface model is created on a computer system comprising computer-aided design (CAD) software.

12. The method for producing a three-dimensional article as recited in claim 10, wherein said surface model comprises a sliced surface model.

13. The method for producing a three-dimensional article as recited in claim 1, the steps further comprising:

f) separating at least a portion of said transparent material surrounding said three-dimensional article from said three-dimensional article.

14. The method for producing a three-dimensional article as recited in claim 13, the steps further comprising:

g) when said three-dimensional article comprises a hollow three-dimensional article, separating a portion of said transparent material remaining inside said three-dimensional article.

15. The method for producing a three-dimensional article as recited in claim 1, wherein said transparent material comprises one from the group: polystyrene, polycarbonate, and acrylonitrile-styrene.

16. The method for producing a three-dimensional article as recited in claim 1, wherein a negative image of said predetermined three-dimensional shape remaining in said piece of transparent material is retained as an output of said method.

17. A method for producing a three-dimensional article, the steps comprising:

a) providing a pulsed, ND-YAG laser system having a predetermined operating wavelength, a predetermined pulse repetition rate, and a power output in the range of approximately 5–50 watts and comprising an expanding, focusing subsystem for providing a dilated, focused laser beam at said predetermined operating wavelength;

b) providing a piece of transparent material having a width, a height and a length, said material being substantially transmissive to electromagnetic energy at said predetermined operating wavelength;

c) providing a numerically controlled machine releasably coupled to said piece of transparent material and adapted to selectively move said transparent material along an X-axis, a Y-axis and a Z-axis, said movement being responsive to a control signal adapted to place a succession of interior points within said transparent material at the focal point of said dilated, focused laser beam;

d) using an electronic controller operatively connected to said numerically controlled machine to provide a control signal representative of a predetermined three-dimensional shape thereto;

e) selectively operating said laser to trace only the surface outline of said predetermined, three-dimensional shape at an interior region of said transparent material as said transparent material is moved in response to said control signal, and wherein said laser beam has a first expanded section with a first beam intensity with a low absorption rate which is transparent to the material, for permeating the material without causing physical changes, and said laser beam subsequently tapering into a focused spot having a second beam intensity with a high absorption rate sufficient enough to cause physical changes, such as cutting;

whereby as said transparent material is moved past the focal point of said laser beam, said predetermined, three-dimensional shape is defined within an interior region thereof and substantially totally separated therefrom.

18. The method for producing a three-dimensional article as recited in claim 17, the steps further comprising:

f) separating at least a portion of said transparent material surrounding said three-dimensional article from said three-dimensional article.

19. The method for producing a three-dimensional article as recited in claim 18, the steps further comprising:

g) when said three-dimensional article comprises a hollow three-dimensional article, separating a portion of said transparent material remaining inside said three-dimensional article.

20. The method for producing a three-dimensional article as recited in claim 17, wherein said predetermined, three-dimensional shape is represented by data comprising a sliced surface model thereof created on a computer system comprising computer-aided design (CAD) software.

21. The method for producing a three-dimensional article as recited in claim 17, wherein said transparent material comprises one from the group: polystyrene, polycarbonate and acrylonitrile-styrene.

* * * * *